(12) United States Patent
Ham

(10) Patent No.: US 6,986,799 B2
(45) Date of Patent: Jan. 17, 2006

(54) RECYCLABLE AIR FILTER

(75) Inventor: Sangsun Ham, Kyungki-Do (KR)

(73) Assignee: Romanow Enterprises, Inc., Kingston, MA (US)

( * ) Notice: Subject to any disclaimer, the term of this patent is extended or adjusted under 35 U.S.C. 154(b) by 178 days.

(21) Appl. No.: 10/418,371

(22) Filed: Apr. 18, 2003

(65) Prior Publication Data

US 2004/0035096 A1 Feb. 26, 2004

Related U.S. Application Data

(60) Provisional application No. 60/404,976, filed on Aug. 21, 2002.

(51) Int. Cl.
*B01D 46/10* (2006.01)

(52) U.S. Cl. .............. 55/521; 55/497; 55/492; 55/502; 55/510; 55/511; 55/DIG. 31; 156/60; 156/73.1; 156/379.6; 156/380.1; 264/DIG. 48

(58) Field of Classification Search ............... 55/497, 55/492, 502, 510, 511, 521, DIG. 31, DIG. 5; 264/DIG. 48; 156/60, 73.1, 379.6, 380.1
See application file for complete search history.

(56) References Cited

U.S. PATENT DOCUMENTS

| 4,174,204 A | 11/1979 | Chase |
| 4,211,543 A | 7/1980 | Tokar et al. |
| 4,617,122 A * | 10/1986 | Kruse et al. ............ 210/493.3 |
| 5,512,172 A * | 4/1996 | Marble ...................... 210/232 |
| 5,531,892 A * | 7/1996 | Duffy ...................... 210/493.1 |
| 5,547,480 A | 8/1996 | Coulonvaux |
| 5,674,302 A | 10/1997 | Nakayama et al. |
| 5,679,122 A * | 10/1997 | Moll et al. .................... 55/497 |
| 5,685,985 A | 11/1997 | Brown et al. |
| 5,693,109 A | 12/1997 | Coulonvaux |
| 5,702,602 A | 12/1997 | Brown et al. |
| 5,730,769 A | 3/1998 | Dungs et al. |
| 5,850,183 A | 12/1998 | Berry, III |
| 5,863,313 A | 1/1999 | Coulonvaux |
| 5,897,676 A | 4/1999 | Engel et al. |
| 5,938,804 A | 8/1999 | Engel et al. |
| 5,993,580 A | 11/1999 | Nakayama et al. |
| 6,319,300 B1 * | 11/2001 | Chen ........................... 55/497 |
| 6,485,538 B1 * | 11/2002 | Toyoshima ................ 55/490 |
| 6,740,136 B2 * | 5/2004 | Duffy ........................... 55/497 |

* cited by examiner

*Primary Examiner*—Duane Smith
*Assistant Examiner*—Minh-Chau T. Pham
(74) *Attorney, Agent, or Firm*—Weingarten, Schurgin, Gagnebin & Lebovici LLP

(57) ABSTRACT

An air filter comprising an elastomeric flange member and a filter member mounted therein. The flange member has opposing ends and sides that define a central opening and protruding members integrally formed with the flange member and extending therefrom. The protruding members have opposed inwardly facing faces. The filter member has filter ends and sides and the filter sides are attached to the opposed faces in an insert molding process or via bonding of the filter sides to the respective faces.

15 Claims, 5 Drawing Sheets

RECYCLABLE AIR FILTER

CROSS REFERENCE TO RELATED APPLICATIONS

This application claims priority of U.S. Provisional Patent Application No. 60/404,976, filed Aug. 21, 2002, entitled AIR FILTER.

STATEMENT REGARDING FEDERALLY SPONSORED RESEARCH OR DEVELOPMENT

N/A

BACKGROUND OF THE INVENTION

The present invention relates generally to filters and more specifically to air filters employed in automotive or other internal combustion engines.

Use of air filters in internal combustion engines is well known. In the past, air filters have incorporated metal frames to which a pleated filter member was attached. The use of a metal or rigid plastic frame for such a filter makes the recycling of such filters difficult and thus undesirable. More recently, efforts have been made to produce filters which may be readily recycled. One such filter is disclosed in U.S. Pat. No. 5,674,302. This filter is fabricated wholly of a non-woven synthetic fiber material which is compressed around the edges during the manufacturing process to form a structural frame member. While this filter advantageously avoids the use of metal components for a surrounding structural member, the fabrication technique requires expensive and specialized manufacturing equipment. It would therefore be desirable to have a technique for producing a filter which could be readily recycled and a filter produced by such a technique that does not necessitate the use of highly specialized manufacturing equipment.

BRIEF SUMMARY OF THE INVENTION

In accordance with the present invention an improved air filter for use in automotive or other internal combustion engines is disclosed. The filter comprises a pleated filter member which is retained within a flange having protruding members extending therefrom that have end faces to which the pleated filter member is bonded or otherwise attached. The pleated filter member may be insert molded with the flange to form the completed air filter assembly. The filter medium is preferably made of a non-woven synthetic fiber material such as a non-woven PE fabric or cellulose or other fibers chemically or physically bonded to provide filtration. The flange and protruding members are preferably integrally formed of a thermoplastic elastomer such as a flexible PVC or olefin, a polyester, a urethane or a styrene material.

Since no metal or rigid plastic components are employed in the construction of the filter, the filter may be readily recycled.

Other aspects, features and advantages of the presently disclosed air filter and method for producing the same will be apparent from the detailed description of the invention that follows.

BRIEF DESCRIPTION OF THE SEVERAL VIEWS OF THE DRAWING

The application will be more fully understood by reference to the following detailed description of the invention in conjunction with the drawing of which.

DETAILED DESCRIPTION OF THE INVENTION

U.S. Provisional Application No. 60/404,976, filed Aug. 21, 2002 and titled AIR FILTER, is incorporated herein by reference.

Figure 1:
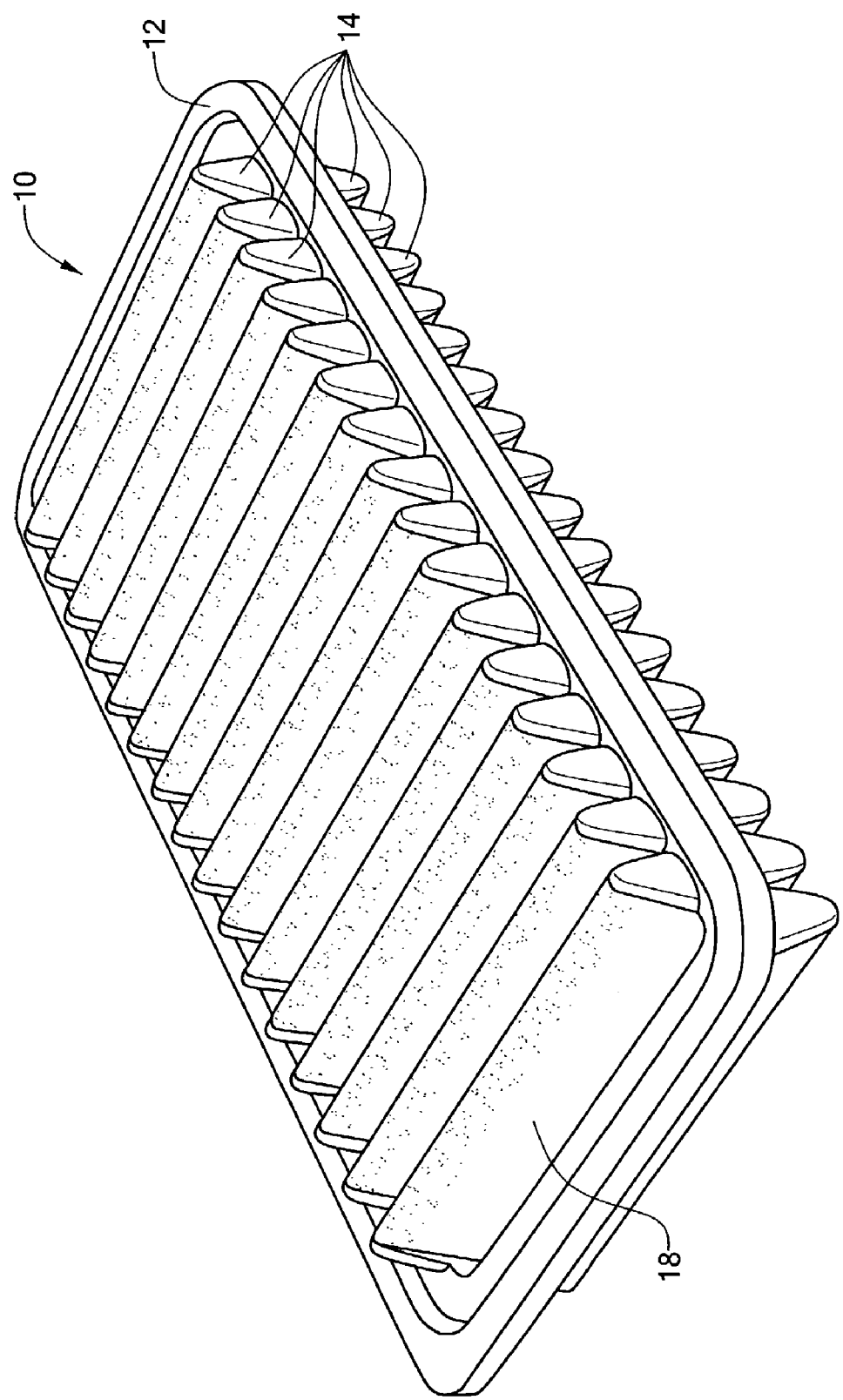
FIG. 1 is a perspective view of an air filter in accordance with the present invention.
Figure 2A:
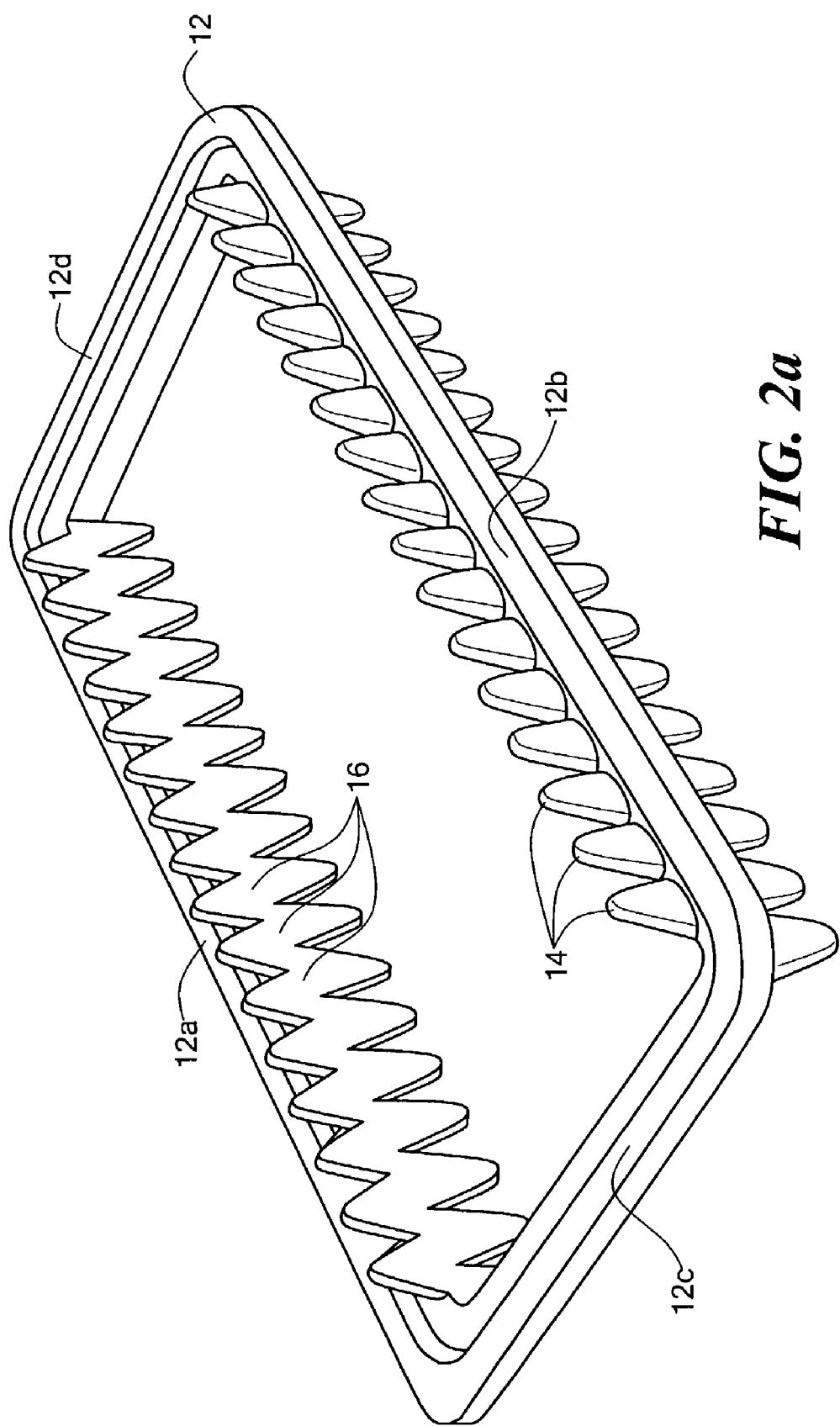
FIG. 2a is a top perspective view of a frame member employed within the air filter depicted in FIG. 1.
Figure 2B:
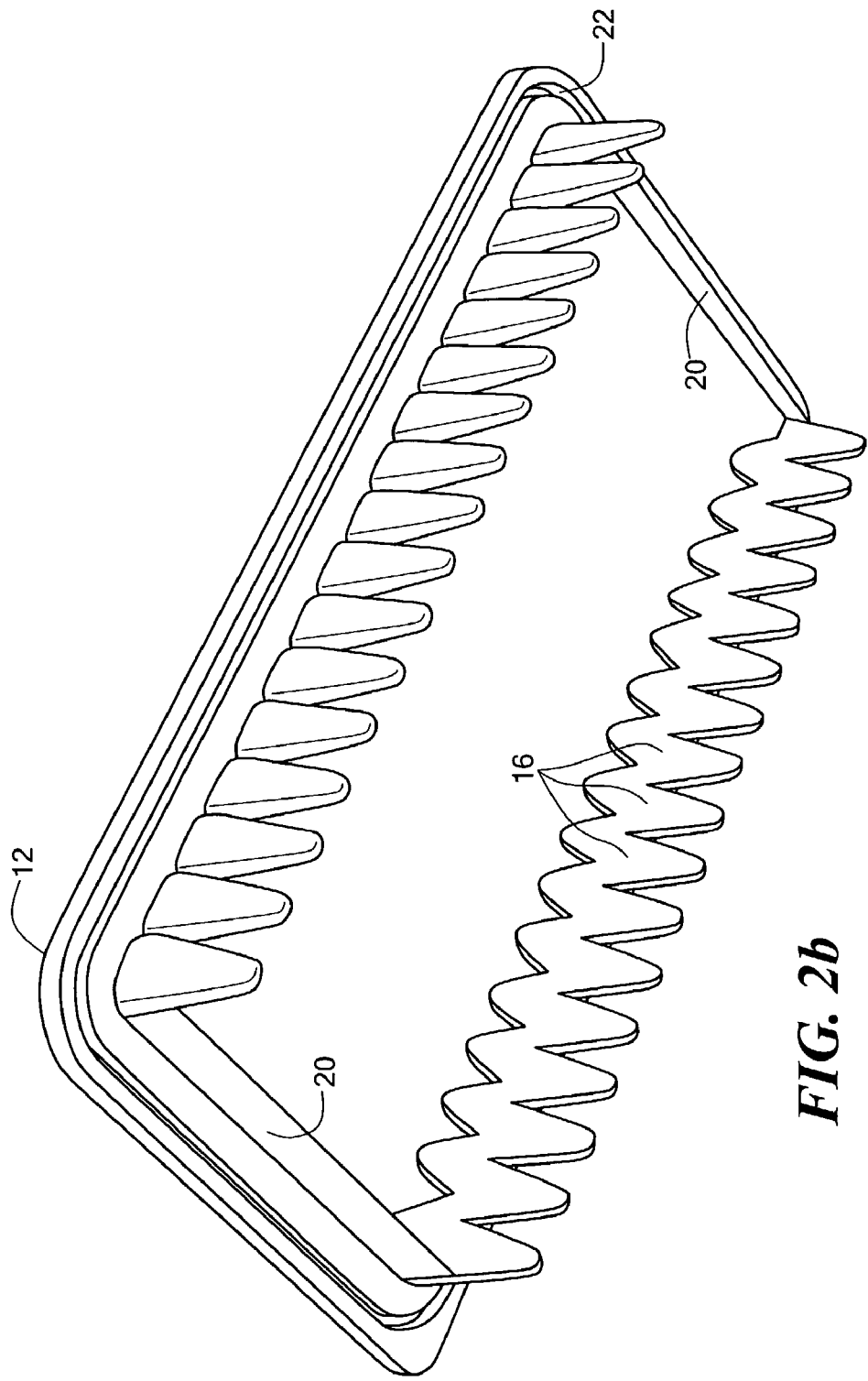
FIG. 2b is a bottom perspective view of the frame member depicted in the air filter of FIG. 1.
Figure 3:
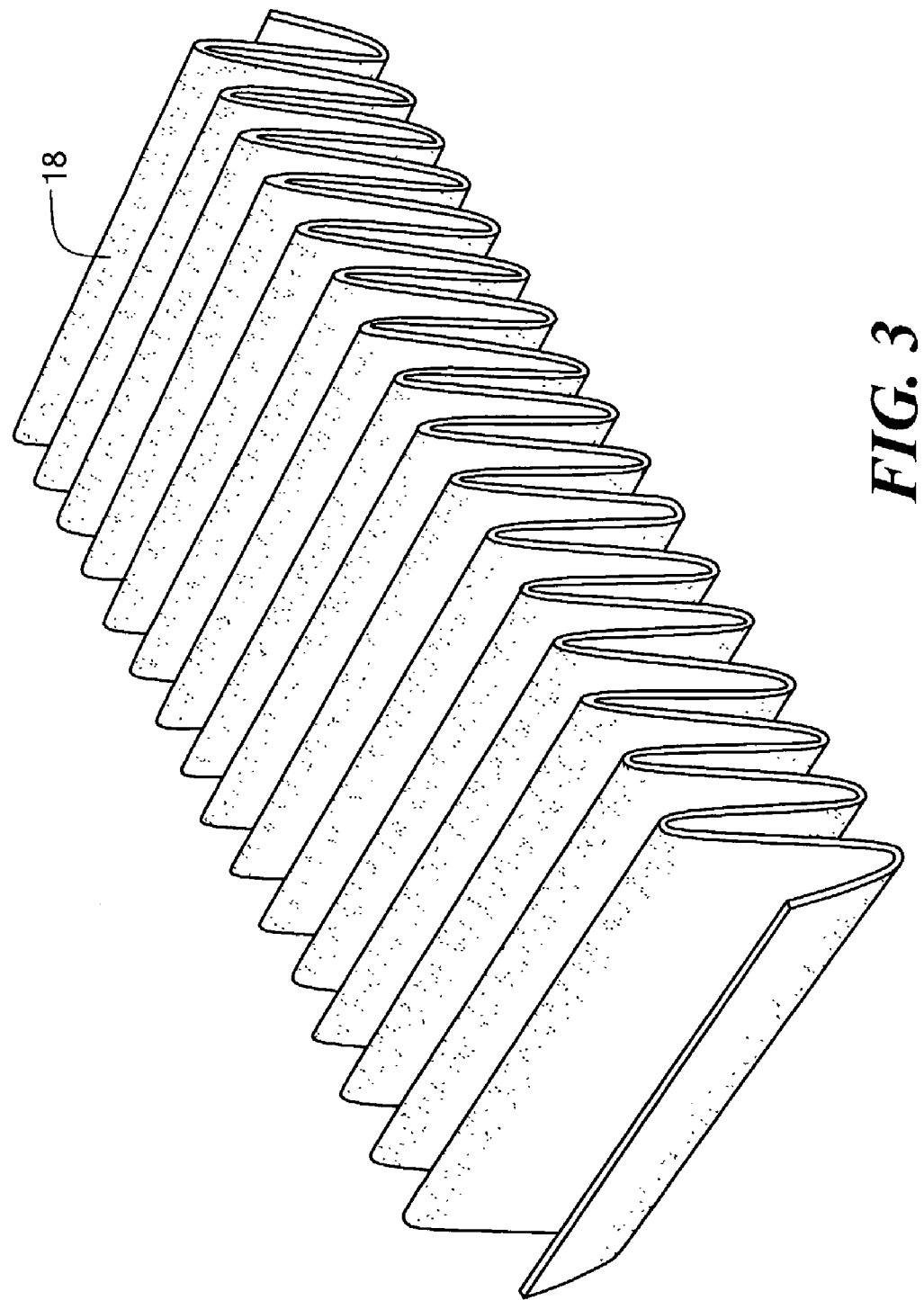
FIG. 3 is a perspective view of a pleated filter member employed in the air filter of FIG. 1.

In accordance with the present invention, an improved air filter is disclosed that may be readily manufactured using conventional manufacturing techniques. Referring to FIGS. 1–3, the air filter 10 comprises an elastomeric flange 12 having protruding members 14 extending therefrom that have inwardly facing faces 16 to which a filter medium 18 is attached via insert molding, bonding, or any other suitable technique for fixing the pleated filter member to the faces of the structural flange. The flange 12 includes opposing sides 12a, 12b and opposing ends 12c, 12d. The protruding members 14 to which the filter member 18 is attached are molded integrally with the flange 12.

The flange 12 and integral protruding members 14 are preferably fabricated of a flexible PVC, ethylene vinylacetate copolymer (EVA), a PVC thermoplastic elastomer (TPE), an olefin, polyester, urethane or styrene TPE or any suitable non-metallic material. In one embodiment, the flange 12 defines a central opening in which the filter medium 18 is disposed. The protruding members 14 that are integrally formed with the flange 12, in one embodiment, comprise generally triangular members that extend above and below a plane through the flange 12 and have generally triangular inwardly facing faces 16. By molding the protruding members 14 so as to provide faces only where needed to attach the sides of the filter medium 18 it is possible to reduce the volume of elastomer needed to form the flange 12 and thereby reduce the cost of the final air filter 10 while maximizing efficient air flow over the filter medium 18. Opposing ends of the flange 12 may include a downwardly extending member 20 to which the filter medium 18 is attached.

Figure 4:
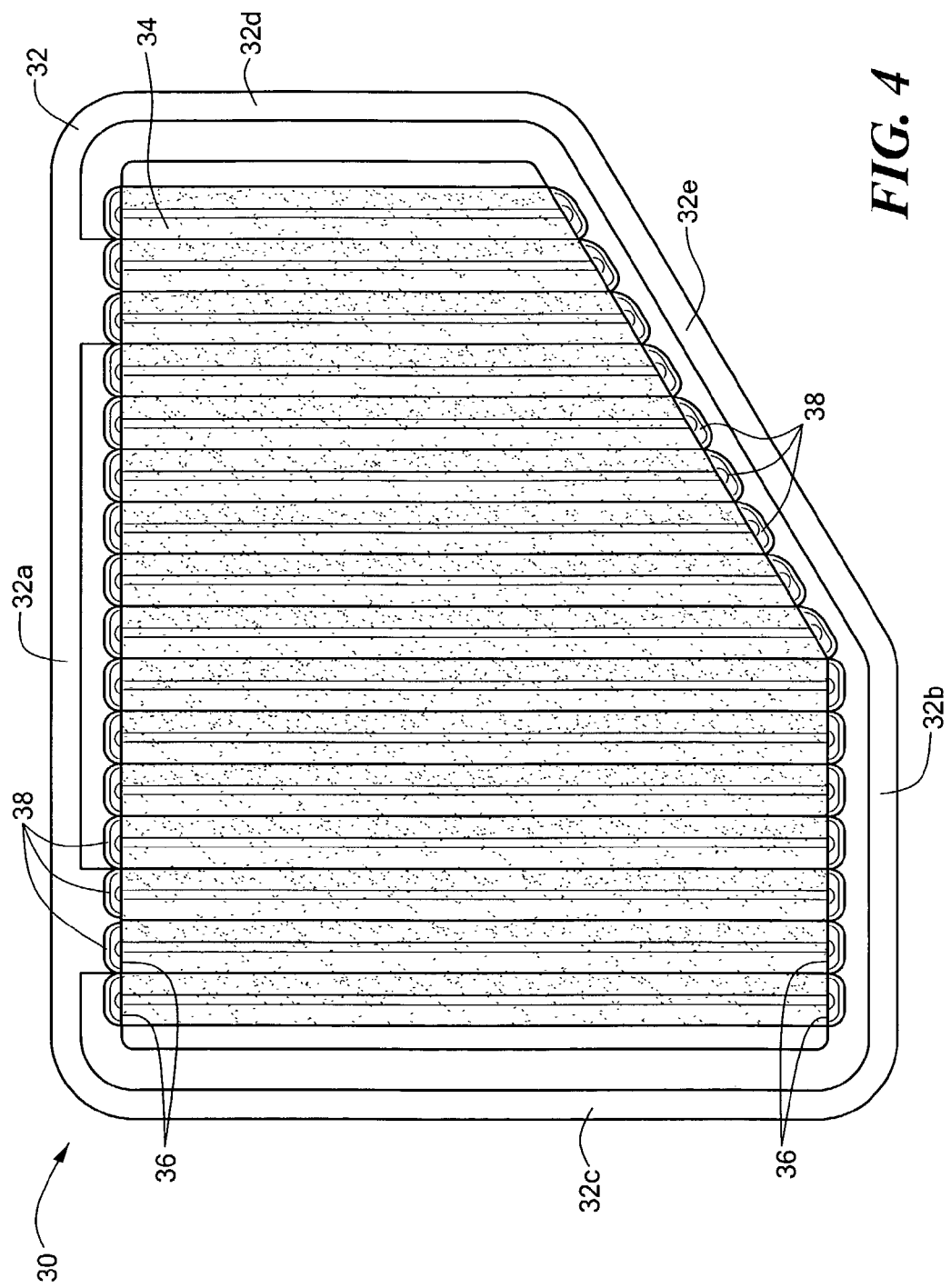
FIG. 4 is a top plan view of another embodiment of an air filter in accordance with the present invention.

While the air filter 10 depicted in FIGS. 1–3 comprises a generally rectangular air filter, it should be recognized that air filters in accordance with the present invention having varying form factors may be constructed. For example, as depicted in FIG. 4, the air filter 30 includes a five sided flange 32 having opposing side members 32a, 32b, opposing end members 32c, 32d and a side member 32e that extends between the side member 32b and the end member 32d. A filter member 34 is mounted to faces 36 or protruding members 38 as discussed above with respect to FIGS. 1–3. In the embodiment illustrated in FIG. 4, the end member 32d is shorter than the end member 32c and the side member 32b is shorter than the side member 32a. The overall side member for the side opposing side member 32a is composed of the side member 32b and the angled side member 32e which extends from one end of side member 32b to one end of side member 32d. Thus, it should be appreciated that air filters in accordance with the present invention may be provided with differing form factors to accomodate different geometric requirements.

The filter medium 18, 34 preferably comprises a pleated filter member which is retained within the respective flange 12, 32. The filter medium 18, 34 is preferably made of a non-woven synthetic fiber material such as non-woven PE fabric or cellulose, a recyclable thermoplastic material, or any other fibers chemically or physically bonded to provide air filtration. Since the air filter 10, 30 employs no metal components, it may be readily recycled.

The flange 12 may include a recess 22 respectively in one surface thereof to mate with a ridge within a cooperative air filter housing to form an air seal at the periphery of the air filter. A similar recess (not visible) may be provided in the five sided flange 32 depicted in FIG. 4. Thus, the flange 12 may function as a seal in cooperation with the filter housing without any additional sealing member(s) although it should be recognized that an additional sealing member may be employed.

It will be appreciated by those of ordinary skill in the art that modifications to and variations of the above described air filter may be made without departing from the inventive concepts disclosed herein. Accordingly the invention should not be viewed as limited except as by the scope and spirit of the appended claims.

What is claimed is:

1. An air filter comprising:
    an elastomeric deformable frame formed as a unitary structure, said frame including:
        a flange member having opposing ends and sides defining a central opening, wherein said flange member defines a plane generally passing through said ends and said sides of said flange member; and
        a plurality of generally triangular pleat engaging members extending outwardly from said flange member to respective pleat engaging member peaks on respective sides of said plane, said pleat engaging members having inwardly facing opposed faces on respective sides of said flange member and on both sides of said plane, said pleat engaging member peaks on opposite sides of the plane being offset along the respective sides of the frame member; and
    a pleated filter element having opposing ends and edges, said pleated filter element having pleat peaks on opposing sides of said filter element, said pleated filter element being disposed in said central opening with selected portions of opposing edges of said filter member pleats engaging opposed faces of said pleat engaging members with pleat peaks disposed on opposite sides of said plane.

2. The air filter of claim 1 wherein said filter element comprises a recyclable thermoplastic material.

3. The air filter of claim 1 wherein said filter element comprises a nonwoven synthetic fiber.

4. The air filter of claim 3 wherein said non-woven synthetic fiber comprises PE fabric.

5. The air filter of claim 3 wherein said non-woven synthetic fiber comprises cellulose.

6. The air filter of claim 1 wherein said frame comprises a thermoplastic elastomer.

7. The air filter of claim 6 wherein said thermoplastic elastomer comprises a polyvinylchloride.

8. The air filter of claim 6 wherein said thermoplastic elastomer comprises an olephin.

9. The air filter of claim 6 wherein said thermoplastic elastomer comprises a polyester.

10. The air filter of claim 6 wherein said thermoplastic elastomer comprises a urethane.

11. The air filter of claim 6 wherein said thermoplastic elastomer comprises a styrene.

12. The air filter of claim 1 wherein said flange member in generally rectangular.

13. The air filter of claim 1 wherein one of said ends of said flange member is longer than the opposing end of said flange member.

14. The air filter of claim 1 further including a mounting member extending from said flange member ends, wherein said filter element has opposing ends mounted to said flange member ends.

15. The air filter of claim 1 wherein said flange member includes a sealing portion that is configured to establish a seal when said sealing portion is disposed in abutting contact with a cooperative member of an associated air filter housing.

* * * * *